United States Patent [19]
Waitts

[11] Patent Number: 5,956,164
[45] Date of Patent: Sep. 21, 1999

[54] TWO-DIMENSIONAL/THREE DIMENSIONAL GRAPHIC MATERIAL AND METHOD OF MAKING SAME

[75] Inventor: Robert Rocco Waitts, Fairfield, N.J.

[73] Assignee: Crown Roll Leaf, Inc., Paterson, N.J.

[21] Appl. No.: 09/013,834

[22] Filed: Jan. 27, 1998

Related U.S. Application Data

[63] Continuation of application No. 08/409,892, Mar. 23, 1995, abandoned, which is a continuation of application No. 08/056,731, May 3, 1993, abandoned.

[51] Int. Cl.$^6$ .................................................. G03H 1/02
[52] U.S. Cl. .............................. 359/2; 359/22; 359/567; 359/900; 283/86; 264/1.31; 264/1.34; 428/30
[58] Field of Search .............................. 359/1, 2, 22, 24, 359/25, 900, 567; 283/86; 264/1.31, 1.34; 428/30

[56] References Cited

U.S. PATENT DOCUMENTS

| | | | |
|---|---|---|---|
| 551,769 | 12/1895 | Jacobson | 428/30 |
| 734,134 | 7/1903 | Porter | 354/354 |
| 734,135 | 7/1903 | Porter | 428/30 |
| 734,361 | 7/1903 | Porter | 428/30 |
| 818,966 | 4/1906 | Ives | 359/566 |
| 1,354,471 | 10/1920 | Doner | 428/30 X |
| 1,787,371 | 12/1930 | Heaton | 428/119 |
| 2,232,551 | 2/1941 | Merton | 428/30 X |
| 2,252,821 | 8/1941 | Thompson | 428/13 X |
| 2,269,521 | 1/1942 | Darrah | 428/30 |
| 2,463,280 | 3/1949 | Kaehni | 359/565 |
| 2,793,148 | 5/1957 | West | 428/38 |
| 2,875,543 | 3/1959 | Sylvester et al. | 428/30 |
| 2,887,806 | 5/1959 | Hassett | 428/26 |
| 3,463,118 | 8/1969 | Wood | 428/29 X |
| 3,515,459 | 6/1970 | Wood | 428/183 X |
| 3,516,730 | 6/1970 | Wood | 359/567 |
| 3,567,561 | 3/1971 | Wood | 428/30 |
| 4,105,290 | 8/1978 | Quinn | 350/162.22 X |
| 4,142,107 | 2/1979 | Hatzakis et al. | 430/30 X |
| 4,523,777 | 6/1985 | Holbein et al. | 283/67 |

(List continued on next page.)

FOREIGN PATENT DOCUMENTS

| | | |
|---|---|---|
| 4678 | of 1822 | United Kingdom . |
| WO 91/06925 | 5/1991 | WIPO . |
| WO 92/04692 | 3/1992 | WIPO . |
| WO 92/16378 | 10/1992 | WIPO . |

OTHER PUBLICATIONS

"The Art & Technology Of Creating 2–D Reflective Holographic Imagery".
"Creating 2D Holograms From Graphics".
Coburn Corporation letter dated Jul. 9, 1984.
Coburn Corporation Advertisement.
Copy of "Panda" Hologram, Light Impressions, Copyright 1984.
Newswanger, C., "A brief historical review of the use of diffraction gratings as decoration", *SPIE*, 1995, 2333, 218–225.
The Diffraction Company, Inc., Riderwood, Maryland, Information Package including literature on products, sample drawings, and price lists, items contain several dates: 1966, 1972, 1986, and 1987, 32 pages.

(List continued on next page.)

*Primary Examiner*—Cassandra C. Spyrou
*Assistant Examiner*—John Juba, Jr.
*Attorney, Agent, or Firm*—Woodcock Washburn Kurtz Mackiewicz & Norris LLP

[57] ABSTRACT

Graphic material includes at least one area bearing a hologram and at least one area bearing a diffraction grating. Preferably, the diffraction grating and the hologram are simultaneously viewable from at least one perspective. The graphic material is made using an embossing die grown from a precursor blank which has been embossed in discrete areas with a holographic microtexture and then partially overstamped with a diffraction grating microtexture. The stamping of the blank may be effected by pressing a suitably shaped die against a shim bearing a diffraction grating microtexture for forming the microtexture in the die shape on the blank.

14 Claims, 3 Drawing Sheets

U.S. PATENT DOCUMENTS

| | | | |
|---|---|---|---|
| 4,589,686 | 5/1986 | McGrew | 428/916 X |
| 4,629,282 | 12/1986 | McGrew | 359/15 |
| 4,716,063 | 12/1987 | Uehara et al. | 428/65 |
| 4,717,221 | 1/1988 | McGrew | 428/916 X |
| 4,743,477 | 5/1988 | Beaver | 428/13 |
| 4,765,724 | 8/1988 | Huichun | 359/567 |
| 4,839,250 | 6/1989 | Cowan | 430/1 |
| 4,856,869 | 8/1989 | Sakata et al. | 359/567 X |
| 4,869,940 | 9/1989 | Shoshani | 428/38 |
| 4,886,687 | 12/1989 | Malott | 428/4 |
| 4,888,260 | 12/1989 | Cowan | 430/1 |
| 4,918,469 | 4/1990 | McGrew | 359/22 |
| 5,044,707 | 9/1991 | Mallik | 359/2 |
| 5,085,514 | 2/1992 | Mallik et al. | 359/2 |
| 5,128,779 | 7/1992 | Mallik | 359/2 |
| 5,138,471 | 8/1992 | McGrew | 359/21 |
| 5,145,212 | 9/1992 | Mallik | 283/86 |
| 5,158,845 | 10/1992 | Waitts et al. | 430/1 |
| 5,281,499 | 1/1994 | Bussard | 430/1 |
| 5,314,767 | 5/1994 | Bussard | 359/2 |
| 5,379,131 | 1/1995 | Yamazaki | 359/2 |
| 5,422,744 | 6/1995 | Katz | 359/2 |

OTHER PUBLICATIONS

Agreement between Diffraction Company, Inc. and Crown Roll Leaf, Inc., Agreement made Jun. 30, 1986, 2 pages.

License Agreement between 3–D, Ltd. and Crown Roll Leaf, Inc., Agreement made May 3, 1990, 9 pages.

Technical Aid Agreement between 3–D, Ltd. and Crown Roll Leaf, Inc., Agreement made May 3, 1990, 6 pages.

Smith, H.M. "Historical Introduction", *Principles of Holography,* Second Edition, 1986, 1–12.

Invoice from Steve Provence Holography, Jan. 4, 1988, 2 pages.

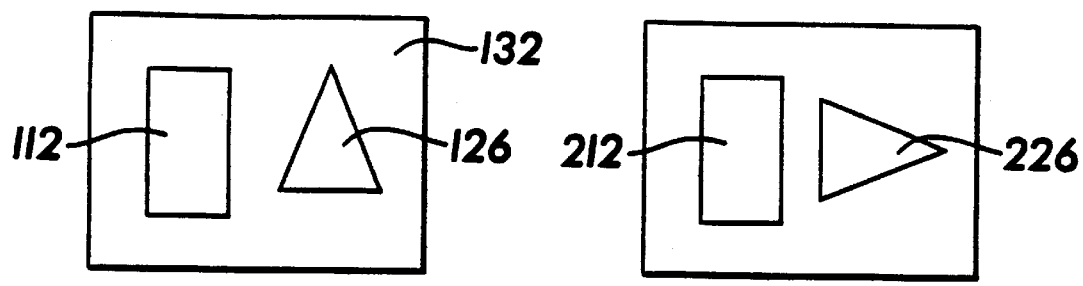
FIG. 4  FIG. 5
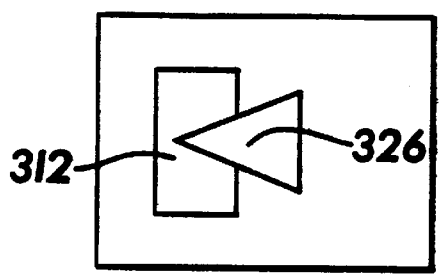 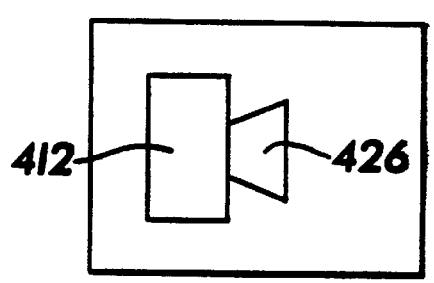
FIG. 6  FIG. 7
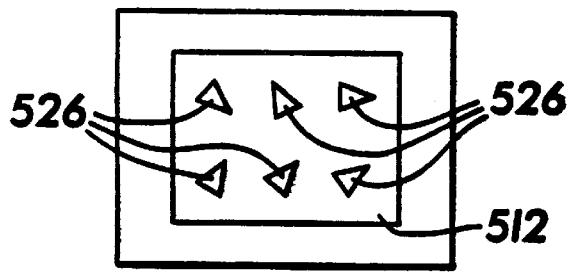 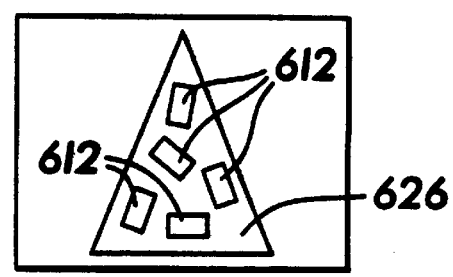
FIG. 8  FIG. 9
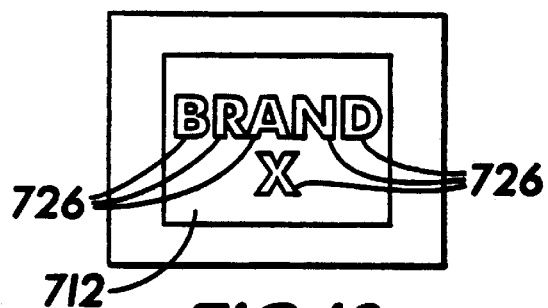 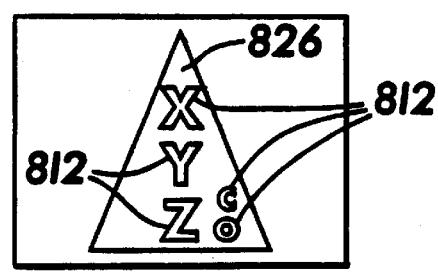
FIG. 10  FIG. 11

TWO-DIMENSIONAL/THREE DIMENSIONAL GRAPHIC MATERIAL AND METHOD OF MAKING SAME

This application is a continuation of application Ser. No. 08/409,892 filed Mar. 23, 1995 which is a file wrapper continuation of 08/056,731 filed May 3, 1993, now both abandoned, which are both hereby incorporated by reference. This application claims the benefit of the filing date of the 08/056,731 application.

FIELD OF THE INVENTION

The present invention relates to displayable indicia and graphic materials, and, more particularly, to graphic materials having holographic and diffraction grating indicia thereon.

BACKGROUND OF THE INVENTION

Holograms are becoming increasingly well known and used in a variety of fields. For example, due to the level of technological sophistication required to produce them, holograms have found significant application for verifying the authenticity of documents like credit cards. Besides being difficult to produce and/or duplicate, holograms have intrinsic aesthetic and functional attributes which render them interesting and appealing to those who view them. In the first instance, the hologram has the capacity to reconstruct a three dimensional image from a two dimensional surface. Further, holograms typically have unusual brightness and coloration which changes with viewing and illumination angle.

Over the years, techniques have been developed for mass-producing low cost holograms, so that their aesthetic attributes can be widely utilized. For instance, holograms are now mass-produced by embossing coated plastic film in web form. Because holograms are interesting and attractive and because methods for economically producing holograms on a large scale have been devised, they have come to be used for packaging and marketing purposes on mass-produced materials and products, such as greeting cards, magazine covers and compact discs. As applied to such marketing and decorative tasks, holograms have certain limitations. For instance, lighting must be provided at a specific orientation and angle to reconstruct the hologram effectively. By way of example, the image should be arranged in an erect orientation and illuminated at 35 degrees relative to the surface of the hologram. Of course, optimum viewing angle and orientation are dependent upon corresponding exposure parameters.

When a hologram is viewed or illuminated at non-optimal angles, the resultant image is degraded in quality and is essentially non-viewable at certain angles and in certain lighting conditions. Since a hologram applied to a product or publication is not guaranteed optimal lighting during the commercial life of the product (e.g., during display on a shelf in a store or newsstand, or sitting on a consumer's coffee table at home), it is likely that a significant portion of the holographic effect will go unappreciated due to uncontrollable marketing and use conditions. As a result, the hologram will not be enjoyed to the maximum extent possible and will not have a maximum commercial impact.

Prior to the popularization of holograms, diffraction gratings embossed in metallized plastic films and other substrates have been used to provide a bright and interesting surface treatment. As is known, diffraction gratings may be produced optically by the interference pattern of a plurality of intersecting beams or mechanically by a ruling engine. Diffraction gratings exhibit brightness and color change with changing viewing angle and therefore are popular for decorating such items as greeting cards, gift wrap, lighters and numerous other products.

While diffraction gratings exhibit color change, they do not convey any three dimensional information. A surface treatment utilizing discrete areas of diffraction gratings disposed at varying selected orientations is disclosed in U.S. Pat. No. 5,158,845 to Waitts, et al. and assigned to the assignee herein, Crown Roll Leaf, Inc. In accordance with the '845 Patent, areas of a substrate which are embossed with a diffraction grating at different orientations (and potentially in different shapes as determined by associated dies) display color changes offset from that of neighboring areas. In this manner, the substrate has a brighter and more interesting diffractive pattern than could be realized using a diffraction pattern arranged at one angular orientation.

SUMMARY OF THE INVENTION

The present invention relates to new and improved graphic material which includes at least one area bearing a hologram and at least one area bearing a diffraction grating. In an exemplary embodiment, the diffraction grating and the hologram are simultaneously viewable from at least one orientation.

In accordance with a unique method for making the new and improved graphic material, a hologram and a diffraction grating are formed in the material such that they are either spaced apart or adjacent to each other. While the hologram and the diffraction grating do not physically overlap, visual images produced by them can provide an overlapping appearance.

BRIEF DESCRIPTION OF THE DRAWINGS

For a better understanding of the present invention, reference is made to the following detailed description of various exemplary embodiments considered in conjunction with the accompanying drawings, in which:

FIGS. 4–11 are plan views of substrates showing various shapes and configurations for indicia in accordance with the present invention.

DESCRIPTION OF THE EXEMPLARY EMBODIMENTS

Figure 1:
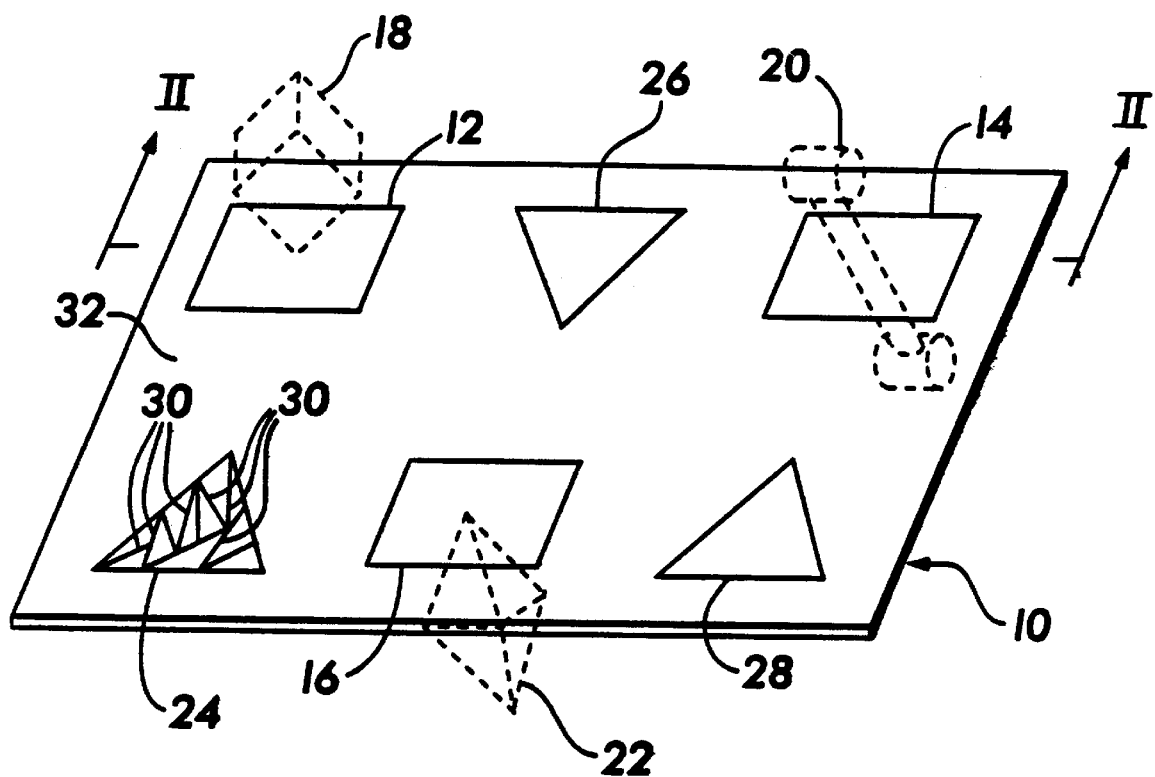
FIG. 1 is a perspective view of a substrate bearing indicia in accordance with an exemplary embodiment of the present invention.

FIG. 1 shows a laminar substrate 10 having two basic types of indicia thereon. A first type of indicia is holographic as represented by rectangular areas 12, 14 and 16, each of which contains a hologram. The holograms contained in the holographic areas 12, 14 and 16 have the ability to produce virtual images 18, 20 and 22, respectively, which are shown in dotted lines. As depicted, the holograms contained in the holographic areas 12, 14 and 16 produce different images; 18 being a cube above the focal plane, 20 being a pair of cylinders joined by a shaft extending through the focal plane, and 22 being a tetrahedron below the focal plane, the focal plane being defined by the plane of the substrate 10. Alternatively, the holograms could be designed to produce identical images or different portions of the same image.

In addition to the holographic indicia, the substrate 10 also includes a second type of indicia represented by triangular areas 24, 26 and 28, each of which contains at least one diffraction grating. The diffraction gratings contained in the diffraction grating areas 24, 26 and 28 produce a two dimensional "rainbow" visual effect, rather than a three-dimensional recorded image. While each of the diffraction grating areas 26 and 28 contains only one diffraction grating, the diffraction grating area 24 is divided into a plurality of triangular subsections 30 which represent areas having a diffraction grating arranged at various different relative orientations, such as described in U.S. Pat. No. 5,158,845, the specification of which is incorporated herein by reference.

Thus, the substrate 10 supports the combination of diffraction gratings in the areas 24, 26 and 28 and holograms in the areas 12, 14 and 16, all of which may be simultaneously viewable in certain conditions. As discussed above, diffraction gratings are more readily viewable in a variety of conditions, whereas holograms are more sensitive to viewing conditions. If a product were made from the substrate 10, which contains both diffraction grating indicia and holographic indicia, the product would therefore enjoy an enhanced visual appearance under a broad range of viewing conditions. More specifically, the two-dimensional rainbow effect produced by the diffraction grating indicia, which effect is more readily visible in diffuse lighting of non-optimal illumination angle, compensates for the more sensitive viewing parameters of the holographic indicia. In this manner, the product is made more commercially valuable in that the decorative visual effect of the diffraction grating indicia is realized even in adverse lighting conditions, while the three-dimensional visual effect produced by the holographic indicia is preserved for appreciation when correct conditions are realized. In other words, the product avoids the total loss of a decorative visual effect as would be the case if it contained only holographic indicia. The present invention therefore contemplates a potential two step process of appreciation; namely, the bright and colorful rainbow effect produced by the diffraction grating indicia catches an observer's eye, whereupon the observer then seeks to examine the product further and views it from various angles, thereby becoming aware of the three-dimensional images produced by the holographic indicia.

In the embodiment shown in FIG. 1, the two types of indicia are separated by an intermediary non-diffractive matrix area 32 for purposes of illustration. In the alternative, the two different types of indicia can be abutting or overlapping to suit the application, as illustrated and described below. The gross shape or pattern of the indicia (i.e., triangles and rectangles) could be any desired shape, such as lettering, or any graphic pattern or combination of shapes. Having now set out an exemplary configuration of an embodiment of the present invention and described its appearance and aesthetic attributes, the composition and methods for forming it shall be described.

Figure 2:
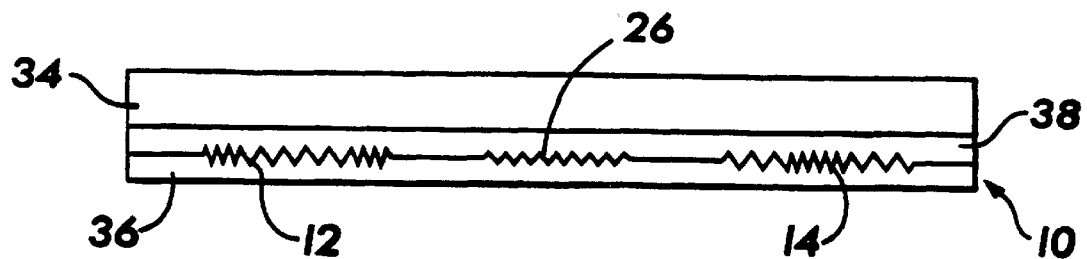
FIG. 2 is a cross-sectional view of the substrate of FIG. 1 taken along section line II—II and looking in the direction of the arrows.

Referring to FIG. 2, the substrate 10 includes a carrier web 34 and a hot-melt adhesive 36. An embossable coating 38, such as a soft lacquer, is interposed between the carrier web 34 and the hot-melt adhesive 36. The side of the coating 38 adjacent to the hot-melt adhesive 36 is embossed with a holographic microtexture in the areas 12 and 14 and with a diffraction grating microtexture in the area 26 and is aluminized to form a thin reflective layer (not shown) between the hot-melt adhesive 36 and the coating 38. The side of the coating 38 adjacent to the carrier web 34 is coated with a wax release layer (not shown) to permit the ready separation of the carrier web 34 from the rest of the substrate 10. More particularly, through the application of heat and pressure to the substrate 10, the hot-melt adhesive 36 is activated to thereby cause the adhesion of the substrate 10 to a juxtaposed product (not shown). Because the heat and pressure also cause the wax release layer to soften, the carrier web 34 separates from the rest of the substrate 10, which adheres to the product as described above.

The depictions of the holographic microtexture in the areas 12 and 14 and the diffraction grating microtexture in the area 26 are greatly exaggerated for the purposes of illustration. However, it should be noted that the holographic microtexture in the areas 12 and 14 is depicted as an irregular pattern, as would be encountered in the case of an interference pattern of a hologram. In contrast, the diffraction grating microtexture in the area 26 is depicted as a regular pattern, in accordance with typical attributes of such gratings.

Figure 3:
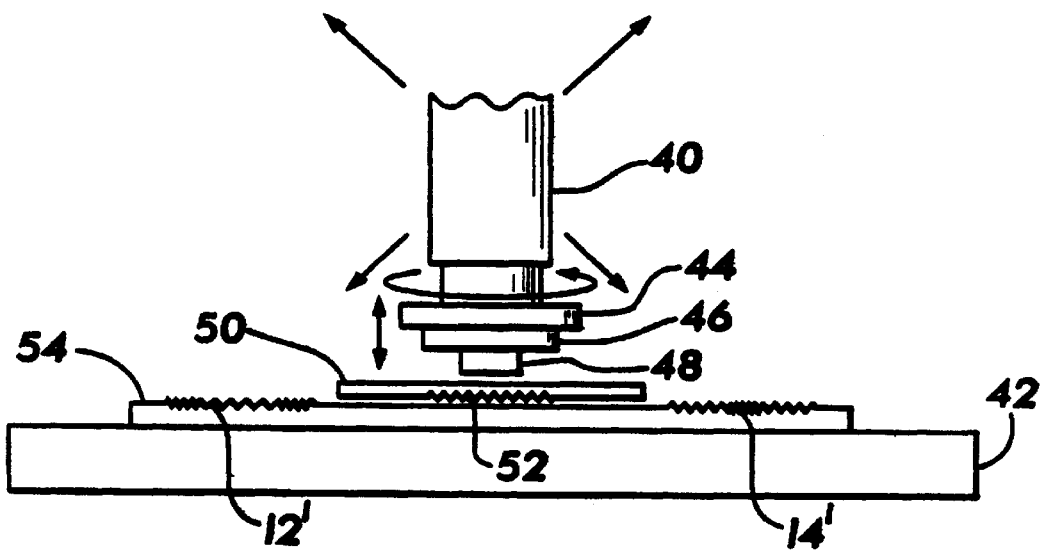
FIG. 3 is a diagrammatic elevational view of an apparatus for forming a microtexture upon a surface to be used in forming indicia in accordance with the present invention.

FIG. 3 illustrates, in diagrammatic form, an apparatus used in the production of the substrate 10 described above and depicts a ram 40 of a hydraulic press positioned above a support platform 42. An adapter 44 is attached to the free end of the ram 40 to enable a selected die 46 to be removably affixed thereto. A raised portion 48 of the die 46 is formed in the shape which a diffraction grating area (e.g., the area 26) is to assume. Thus, for example, to form the triangular area 26 of FIG. 1, the raised portion 48 would be triangular. Of course, dies may be made in any form, such as, in the shape of a company logo or trademark.

A diffraction grating shim 50 having a microgroove pattern 52 on one surface is positioned between the die 46 and an embossable blank 54 disposed upon the platform 42. The microgroove pattern 52 is formed on the shim 50 by a ruling engine or, in the alternative, the shim 50 is grown (e.g., by nickel electroplating) from an exposed and developed microtexture interference pattern in photoresist. The microgroove pattern 52 therefore constitutes a diffraction grating.

A negative of the microgroove pattern 52 is embossed into the blank 54 through the pressure exerted by the ram 40 acting through the raised portion 48 of the die 46 and impressing the microgroove pattern 52 of the shim 50 into the blank 54. The blank 54 is preferably formed from an embossable thermoplastic, such as acrylic, and includes areas 12' and 14' in which a holographic microtexture has been previously embossed by another shim (not shown) which has been grown so that it incorporates the holographic microtexture. Accordingly, the areas 12' and 14' are precursors to the holographic indicia of the finished substrate 10 illustrated in FIG. 1 as shall be described below. The blank 54 is therefore embossed in selected areas with diffraction grating, as well as holographic microtextures.

As described above, the holographic microtexture is impressed into the blank 54 first and the diffraction grating is embossed thereafter. Alternatively, the diffraction grating could be produced before the holographic microtexture. Further, while a discontinuous holographic microtexture (i.e., areas 12' and 14') is shown, the entire surface or any portion thereof could be embossed with holographic microtexture, which is then overstamped to a selected extent with diffraction grating microtexture.

It has been found that a nickel shim 50 is suitable for pressing diffraction gratings into the blank 54 at die temperatures of about 200 to 300 degrees Fahrenheit, at pressures of from 50 to 150 p.s.i. and with dwell times ranging from 1.5 to 3 seconds. These parameters are dependent upon variables such as die shape and shim thickness. It has been found that embossable coatings may be applied to the blank 54 prior to embossing so as to facilitate impressing the microgroove pattern 52 into the blank 54 for certain applications.

After having made a single impression of the microgroove pattern 52 (in the shape of the raised portion 48 of the die 46), the ram 40, the blank 54 and/or the platform 42 can be repositioned such that another selected area of the blank 54 is embossed. In the drawing, the ram 40 is shown to be positionable at any point in a plane parallel to the blank 54. In addition, the ram 40, the adapter 44 and/or the die 46 may be rotatable to permit indexing of the die 46 about an axis (e.g., the axis of the ram 40). Furthermore, the shim 50 can be repositioned through 360 degrees at any orientation with respect to the blank 54. In this manner, diffraction grating or holographic areas may be embossed in the blank 54 at any location, at any orientation of the die and at any orientation of the diffraction grating. Patterns may be created easily by moving the respective apparatus elements in sequential discrete steps with respect to the blank 54. This is known as "stepping out" a pattern.

Having thus formed an embossed blank 54 with diffraction grating areas and holographic microtextured areas, a master embossing plate or shim (not shown) can be grown from the resulting blank 54 in a manner which is conventional in the art. For example, the textured surface of the blank 54 is silvered and then electroplated with nickel to yield a master plate. The resulting master plate may then be used to emboss a web of material in which the indicia is to be embodied (e.g., a lacquer-coated carrier web of polyester or like material), the web being previously or subsequently coated with an aluminum reflective layer by vapor deposition or any other suitable process.

In designing an indicia combination, it is preferable to design the pattern for the diffraction grating overlay or overstamp in cooperation with the holographic pattern carried by the blank 54 and present in the finished product. In this regard, there should be sufficient spacing between the diffraction grating areas such that the holographic indicia is not obliterated or obscured. Further, the pattern (graphic content) of the two-dimensional indicia (diffraction grating) should complement and coordinate with the pattern of the three-dimensional indicia (hologram). In an effort to render the holographic indicia less sensitive to viewing conditions, the hologram utilized to generate the shim for forming the holographic microtextures in the blank 54 may be rotated at least once for a subsequent exposure to increase the number of viewing orientations allowing for reconstruction of the virtual image.

The foregoing methods can be used to produce two-dimensional/three-dimensional indicia wherein the 3D information is generated by holographically recording a three-dimensional model or by a simulated 3D model comprised of a plurality of spaced transparent plates bearing artwork, such as line drawings, or a combination of the two, as is known to be used in the holographic arts. As such, the holographic indicia can be a photo record of a real object and/or a drawn image (e.g., a graphic pattern).

FIGS. 4–11 show a variety of potential combinations with respect to the relative layout of the indicia upon a substrate material. In referring to these figures, reference numbers for elements which are equivalent to those discussed in FIGS. 1–3 shall be used and increased by corresponding increments of one hundred.

FIG. 4 depicts a substrate having holographic area 112 adjacent to diffraction grating area 126 and separated therefrom by intermediary matrix area 132.

In FIG. 5, holographic area 212 and diffraction grating area 226 are adjacent and abutting along one side.

FIG. 6 shows an apparent overlap of diffraction grating area 326 and holographic area 312. This could be achieved by partially over-stamping holographic information equivalent to the holographic area 112 of FIG. 4 in the formation of the blank 54 or by embossing the diffraction grating microtexture in the blank 54 in abutting relationship to a holographic microtexture equivalent (precursor to the holographic area 312), with a side groove to accommodate the precursor to the diffraction grating area 326. The visual effect, however, is an apparent overlay of the diffraction grating area 326 regardless of the technique employed to create the effect.

In FIG. 7, the overlay effect is reversed with holographic area 412 overlying diffraction grating area 426.

FIG. 8 illustrates the effect of an apparent overstamp or overlay of a plurality of small, discrete diffraction grating areas 526 upon an apparent background consisting of holographic area 512. As noted previously, the overlay is an implied visual effect rather than a necessary expression of actual physical construction or the process of producing this effect. For example, a diffraction grating precursor could cover the entire indicia area of the blank 54 in a first step whereupon an overstamping of hologram microtexture having voids corresponding to the shape of the diffraction grating areas 526 could be impressed in the blank 54 to provide the apparent "background" field of the holographic area 512.

FIG. 9 shows a reversal of roles of holographic areas 612 and diffraction grating area 626 as compared to FIG. 8.

FIG. 10 illustrates that diffraction grating areas 726 can be in the form of graphic symbols which are apparently overstamped upon a background consisting of holographic area 712.

In FIG. 11, the roles of diffraction grating area 826 and holographic areas 812 are reversed from that of FIG. 10.

In conclusion, what has been described herein is a material or substrate bearing a type of indicia and a method for forming same wherein the indicia is a combination of two-dimensional diffraction gratings, which are viewable over a wide range of viewing angles, and holographic indicia, which are more sensitive to viewing angle. The indicia are complementary with respect to viewing angle and visual effect.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A method of making graphic material, comprising the steps of:
(a) forming a visible light hologram continuously over a first area of said graphic material;
(b) forming a non-holographic diffraction grating for diffracting visible light continuously over a second area of said graphic material, separate from, but co-planar with said first area, by creating a series of parallel grooves, said steps of forming said hologram and forming said non-holographic diffraction grating occurring simultaneously via the microembossing of a single surface of an embossable media; and (c) simultaneously metallizing at least said first and second areas of said single surface after said first and second areas have been formed further comprising the steps of embossing a surface of a blank with a negative impression of a microtexture constituting said hologram and embossing said surface of said blank with a negative impression of a microtexture constituting said non-holographic diffraction grating and growing an embossing shim from said surface of said blank for microembossing said embossable media, wherein said step of embossing said surface of said blank with said negative impression of said microtexture constituting said non-holographic diffraction grating includes positioning a shim having a non-holographic diffraction grating microtexture between said blank and a die and pressing said die against said shim and said blank to impress said non-holographic microtexture of said shim in said blank.

2. The method of claim 1, wherein said hologram is a rainbow hologram.

3. The method of claim 1, wherein at least a portion of the hologram and at least a portion of the non-holographic diffraction grating are simultaneously viewable at a selected viewing orientation.

4. The method of claim 1, wherein the first area and the second area are adjacent to each other.

5. The method of claim 1, wherein the non-holographic diffraction comprises a textual matter.

6. The method of claim 1, wherein the non-holographic diffraction comprises representational indicia.

7. The method of claim 1, wherein the hologram comprises a graphic pattern.

8. The method of claim 1, further comprising the step of forming a diffracting grating in a third area of the graphic material, the second and third areas being separate and distinct and co-planar with the first area.

9. The method of claim 1, wherein the second area is surrounded by the first area.

10. The method of claim 1, wherein the first area is surrounded by the second area.

11. The method of claim 1, further comprising the step of forming a non-diffractive matrix area between the first and second areas.

12. The method of claim 1, wherein the second area contains a plurality of discrete subdivisions, wherein each subdivision has a relative orientation angle that differs from an orientation angle of at least one other subdivision.

13. The method of claim 12, wherein the step of growing an embossing shim comprises the step of metallizing the surface of the blank.

14. The method of claim 13, wherein the step of growing an embossing shim further comprises the step of electroplating the surface of the blank.

* * * * *